United States Patent [19]

Nanishi et al.

[11] Patent Number: 5,032,641

[45] Date of Patent: Jul. 16, 1991

[54] WATER-REPELLENT FILM-FORMING COMPOSITION

[75] Inventors: Kiyoshi Nanishi, Hiratsuka; Hideo Kogure, Atsugi; Heihachi Murase, Oiso, all of Japan

[73] Assignee: Kansai Paint Co., Ltd., Kyogo, Japan

[21] Appl. No.: 380,595

[22] Filed: Jun. 26, 1989

[30] Foreign Application Priority Data

Jun. 28, 1988 [JP] Japan ................................ 63-157939
Jun. 28, 1988 [JP] Japan ................................ 63-157940
Jun. 28, 1988 [JP] Japan ................................ 63-157941

[51] Int. Cl.$^5$ .............................................. C08L 27/12
[52] U.S. Cl. .................................... 524/544; 524/588; 526/245
[58] Field of Search ................. 524/544, 528, 245; 526/299

[56] References Cited

U.S. PATENT DOCUMENTS 2,900,355  8/1959  Novy et al. .......................... 524/544
3,975,352  8/1976  Yoerger et al. ...................... 524/544

FOREIGN PATENT DOCUMENTS 0065388  11/1982  European Pat. Off. .
3609459  10/1986  Fed. Rep. of Germany .
58185609  10/1983  Japan .

OTHER PUBLICATIONS

"Chemical Abstracts", vol. 107, No. 4, p. 85, Abstract No. 24885(w), July, 1987.

Primary Examiner—Joseph L. Schofer
Assistant Examiner—Jeffrey T. Smith
Attorney, Agent, or Firm—Wenderoth, Lind & Ponack

[57] ABSTRACT

A water-repellant film-forming composition comprising a mixture of (a) a (co)polymer of 5 to 100% by weight of a specific fluoroalkyl group-containing (meth)acrylic monomer and 0 to 95% by weight of an unsaturated monomer co-polymerizable with the fluoroalkyl group-containing (meth)acrylic monomer, and (b) a copolymer of 0.1 to 75% by weight of a specific silicon-containing polymerizable unsaturated monomer and 25 to 99.9% by weight of an unsaturated monomer copolymerizalbe with the silicon-containing polymerizable unsaturated monomer, and fine silica particles having an average particle diameter of not more than 5 micrometers, in specified amounts.

20 Claims, No Drawings

WATER-REPELLENT FILM-FORMING COMPOSITION

This invention relates to a water-repellent film-forming composition comprising a fluoroalkyl group-containing polymer and/or a silicon-containing polymer and a particulate material as main components.

Typical water-repellent materials include, for example, hydrocarbon-type polymer materials typified by polyethylene, fluorine resin-type polymer materials typified by polytetrafluoroethylene and silicone polymer materials.

Polytetrafluoroethylene has a "contact angle with water", a measure of the degree of hydrophobicity, of about 120°, and is a material having particularly high hydrophobicity (the polar component $\gamma_p$ of its surface tension is low).

The degree of water repellency of polytetrafluoroethylene is still insufficient under some environmental conditions in which it is used. It is therefore desired to develop a material having higher water repellency.

To achieve this desire, the present inventors have made extensive investigations, and have finally developed a film-forming composition which has a "contact angle with water" of at least 140°, a higher "contact angle with paraffin" than that of a polytetrafluoroethylene film (the dispersed component $\gamma_d$ of its surface tension is lower than that of polytetrafluoroethylene), and higher water repellency than the polytetrafluoroethylene film.

Thus, the present invention provides a water-repellent film-forming composition comprising

[A] a polymer selected from the group consisting of
(a) a (co)polymer composed of 5 to 100 % by weight of a fluoroalkyl group-containing (meth)acrylic monomer represented by the following general formula (I)

$$CH_2=\underset{\underset{R_1}{|}}{C}-\underset{\underset{O}{\|}}{C}-O-(CH_2)_l-Rf \qquad (I)$$

wherein $R_1$ represents a hydrogen atom or a methyl group, $l$ is an integer of 1 to 11, and Rf represents $-C_mF_{2m-1}$ or $-C_nF_{2n}H$ in which m is an integer of 1 to 20 and n is an integer of 1 to 20,
and 0 to 95 % by weight of an unsaturated monomer copolymerizable with the fluoroalkyl group-containing (meth)acrylic monomer, (b) a copolymer composed of 0.1 to 75 % by weight of a silicon-containing polymerizable unsaturated monomer represented by the following general formula (II)

$$CH_2=\underset{\underset{R_2}{|}}{C}-R_3 \qquad (II)$$

wherein $R_2$ represents a hydrogen atom or a methyl group, and $R_3$ represents a group of the formula

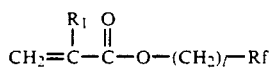

in which j is an integer of 0 or 1, k is an integer of 0 to 6, p is an integer of 1 to 5, q is an integer of 1 to 20, r is an integer of 0 to 2, s is an integer of 1 to 3, and r+s=3, and 25 to 99.9 % by weight of an unsaturated monomer copolymerizable with the silicon-containing polymerizable unsaturated monomer, and (c) a mixture of the (co)polymer (a) and the copolymer (b), and

[B] a particulate material having an average particle diameter of not more than 5 micrometers.

The composition of this invention will be described below in detail.

Polymer [A]

(Co)polymer (a)

The (co)polymer (a) that can be used in the water-repellent film-forming composition of this invention denotes a homopolymer of a fluoroalkyl group-containing (meth)acrylic monomer of general formula (I), a copolymer of monomers of general formula (I) with each other, or a copolymer of the fluoroalkyl group-containing (meth)acrylic monomer with at least one other unsaturated monomer copolymerizable with it.

The fluoroalkyl group-containing (meth)acrylic monomer used in the preparation of the (co)polymer (a) is a monomer represented by the following general formula (I) [to be sometimes referred to as monomer (I)]

$$CH_2=\underset{\underset{R_1}{|}}{C}-\underset{\underset{O}{\|}}{C}-O-(CH_2)_l-Rf \qquad (I)$$

wherein $R_1$ represents a hydrogen atom or a methyl group; $l$ is an integer of 1 to 11, preferably 1 to 6, more preferably 1 to 3; and Rf represents a group of the formula $-C_mF_{2m-1}$ or $-C_nF_{2n}H$ in which m is an integer of 1 to 20, preferably 1 to 10, especially preferably 2 to 8, and n is an integer of 1 to 20, preferably 1 to 10, more preferably 2 to 8.

Examples of the monomer (I) include perfluoroalkyl (meth)acrylates having a perfluoroalkyl group with 1 to 20 carbon atoms, such as 2-perfluorooctylethyl (meth)acrylate, $$CH_2=CH-COO-CH_2CH_2-C_8F_{17},$$

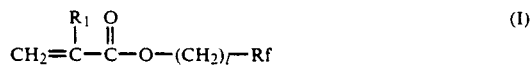

2-perfluoroisononylethyl (meth)acrylate,

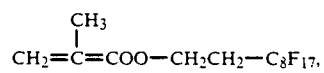

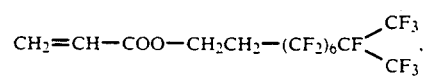

2-perfluorononylethyl (meth)acrylate,
2-perfluorodecylethyl (meth)acrylate,
2-perfluorobutylethyl (meth)acrylate,
perfluoromethylmethyl (meth)acrylate,
perfluoroethylmethyl (meth)acrylate,
perfluorobutylmethyl (meth)acrylate,
perfluorooctylmethyl (meth)acrylate,
perfluorodecylmethyl (meth)acrylate,
perfluoromethylpropyl (meth)acrylate,
perfluoropropylpropyl (meth)acrylate, perfluorooctylpropyl (meth)acrylate,
perfluorooctylamyl (meth)acrylate, and
perfluorooctylundecyl (meth)acrylate; and fluoroalkylalkyl (meth)acrylates resulting from substitution of a hydrogen atom for one fluorine atom of the perfluoroalkyl moiety in these perfluoroalkylalkyl (meth)acrylates such as
2-hydrogen hexafluoropropylmethyl acrylate, $CH_2=CH\text{-}COO\text{-}CH_2\text{-}CF_2CFHCF_3$,
4-hydrogen octafluorobutylmethyl methacrylate,
6-hydrogen dodecafluorohexylmethyl methacrylate,
8-hydrogen hexadecafluorooctylmethyl acrylate, and
2-hydrogen tetrafluoroethylmethyl methacrylate.

Especially preferred among them are 2-perfluorooctylethyl methacrylate and 2-perfluoroisononylethyl methacrylate.

Examples of the other unsaturated monomer (to be referred to as the "comonomer") copolymerizable with the monomer (I) include $C_{1-18}$ alkyl esters of (meth)acrylic acid such as methyl acrylate, ethyl acrylate, propyl acrylate, isopropyl acrylate, butyl acrylate, hexyl acrylate, 2-ethylhexyl acrylate, n-octyl acrylate, lauryl acrylate, methyl methacrylate, ethyl methacrylate, propyl methacrylate, isopropyl methacrylate, butyl methacrylate, hexyl methacrylate, 2-ethylhexyl methacrylate, n-octyl methacrylate and lauryl methacrylate; glycidyl esters of (meth)acrylic acid such as glycidyl acrylate and glycidyl methacrylate; $C_{2-18}$ alkoxyalkyl esters of (meth)acrylic acid such as methoxybutyl acrylate, methoxybutyl methacylate, methoxyethyl acrylate, methoxyethyl methacrylate, ethoxybutyl acrylate, and ethoxybutyl methacrylate; $C_{2-6}$ alkenyl esters of (meth)acrylic acid such as allyl acrylate and allyl methacrylate; $C_{2-8}$ hydroxyalkyl esters of (meth)acrylic acid such as hydroxyethyl acrylate, hydroxyethyl methacrylate, hydroxypropyl acrylate and hydroxypropyl methacrylate; mono- or di-($C_{1-6}$ alkyl)aminoalkyl esters of (meth)acrylic acid such as dimethylaminoethyl acrylate, diethylaminoethyl acrylate, dimethylaminoethyl methacrylate and diethylaminoethyl methacrylate, dimethylaminopropyl methacrylate, methylaminoethyl methacrylate; acrylamide and methacrylamide; acrylic acid and methacrylic acid; (meth)acryloyloxyalkylpolymethylsilicones represented by the following formula

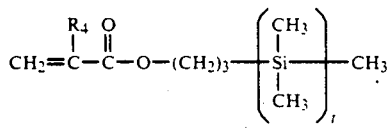

wherein $R_4$ represents a methyl group or a hydrogen atom, t is an integer of 1 to 50, preferably 1 to 30, more preferably 1 to 15, such as gamma-(meth)acryloyloxypropylpolymethylsilicone; fluoroethers having a (meth)acryloyloxy group, such as

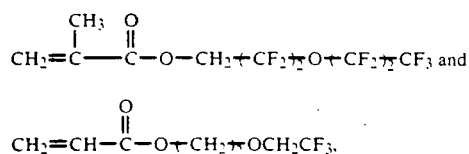

vinyl aromatic compounds such as styrene, styrenepentafluoride, alpha-methylstyrene and vinyltoluene; and unsaturated monomers such as acrylonitrile, methacrylonitrile, acrolein, methacrolein, butadiene and isoprene.

The $C_{1-18}$ alkyl esters of (meth)acrylic acid and styrene are preferred among these comonomers.

Another preferred group of comonomers are silicon-containing polymerizable unsaturated monomers represented by the following general formula (II)

wherein $R_2$ represents a hydrogen atom or a methyl group, and $R_3$ represents a group of the formula

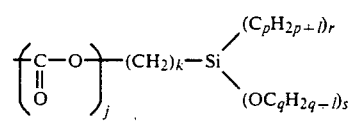

wherein j is an integer of 0 or 1, k is an integer of 0 to 6, preferably 1 to 4, more preferably 2 or 3, p is an intger of 1 to 5, preferably 1 to 3, q is an integer of 1 to 20, preferably 1 to 10, more preferably 1 to 4, r is an integer of 0 to 2, s is an integer of 1 to 3, and r+s=3.

Specific examples of the comonomer of general formula (II) include vinyltrimethoxysilane, vinyltriethoxysilane, gamma-acryloyloxypropyltrimethoxysilane, gamma-methacryloyloxypropyltrimethoxysilane, gamma-methacryloyloxypro-pylmethyldimethoxysilane, vinylmethyldimethoxysilane, vinyldimethylmethoxysilane and gammamethacryloyloxypropyldimethylmethoxysilane. Of these, gamma-methacryloyloxypropyltrimethoxysilane and gammamethacryloyloxypropylmethyldimethoxysilane are preferred.

The proportions of the monomer (I) and the comonomer are 5 to 100 % by weight, preferably 10 to 100 % by weight, more preferably 20 to 100% by weight, for the monomer (I) and 0 to 95 % by weight, preferably 0 to 90 % by weight, more preferably 0 to 80 % by weight, for the comonomer based on the total weight of the two. If the amount of the monomer (I) is less than 5 % by weight, it is generally difficult to expect a sufficient water-repelling effect.

When the silicon-containing polymerizable unsaturated monomer of formula (II) is used as the comonomer, the copolymer (a) is preferably composed of
(i) 5 to 99.9 % by weight, preferably 30 to 97.5 % by weight, especially preferably 50 to 97.5 % by weight, of the monomer (I),
(ii) 0.1 to 75 % by weight, preferably 2.5 to 50 % by weight, preferably 2.5 to 30 % by weight of the silicon-containing polymerizable unsaturated monomer of formula (II), and
(iii) 0 to 94.9 % by weight, preferably 0 to 67.5 % by weight, especially preferably 0 to 40 % by weight, of the other comonomer mentioned above.

Polymerization of the monomers for producing the (co)polymer (a) is carried out by a method known per se, for example by the same method as in the production of an ordinary acrylic resin, and any of solution polymerization and emulsion polymerization can be employed. The solvent used is a good solvent for the resulting polymer. For example, trichlorotrifluoroethane, m-xylene hexafluoride and tetrachlorohexafluorobutane are preferably used. As a polymerization initiator, usual peroxides or azo compounds, such as benzoyl peroxide, azo- azo-bis-(dimethylvaleronitrile) and azobisisobutyronitrile. may be used. The preferred reaction temperature is generally 40 to 140° C.

Preferably, the (co)polymer (a) has a number average molecular weight of usually about 3,000 to about 500,000, more preferably about 3,000 to about 70,000, and especially preferably about 5,000 to about 45,000. If its number average molecular weight exceeds about 500,000, formation of a phase-separated-structure becomes difficult at the time of film formation. On the other hand, if the number average molecular weight is below about 3,000, the phase-separated-structure after the film formation changes rheologically and the water repellency tend to be degraded with the lapse of time.

Copolymer (b)

The copolymer (b) which can be used as a polymer component in the composition of this invention is a copolymer of the silicon-containing polymerizable unsaturated monomer of general formula (II) and the other unsaturated monomer copolymerizable with the silicon-containing polymerizable unsaturated monomer. The silicon-containing polymerizable unsaturated monomer is a monomer represented by general formula (II)

wherein $R_2$ represents a hydrogen atom or a methyl group, and $R_3$ represents a group of the formula

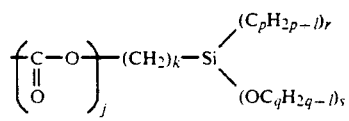

in which j is an integer of 0 or 1, k is an integer of 0 to 6. preferably 1 to 4, especially preferably 2 or 3, p is an integer of 1 to 5, especially preferably 1 to 3, q represents an integer of 1 to 20. preferably 1 to 10, especially preferably 1 to 4, r represents an integer of 0 to 2, s represents an integer of 1 to 3, and r+s=3 [to be referred to as monomer (II)].

Specific examples of the monomer (II) are vinyltrimethoxysilane, vinyltriethoxysilane, gammaacryloyloxypropyltrimethoxysilane, gamma-methacryloyloxypropyltrimethoxysilane, gamma-methacryloyloxypropylmethyldimethoxysilane, vinylmethyldimethoxysilane, vinyldimethylmethoxysilane and gamma-methacryloyloxypropyldimethylmethoxysilane. Of these, gamma-methacryloyloxypropyltrimethoxysilane and gamma-methacryloyloxypropylmethyldimethoxysilane are preferred.

Examples of the other unsaturated monomer (comonomer) which is copolymerizable with the monomer of formula (II) may be the unsaturated monomers cited above as examples of the unsaturated monomers copolymerizable with the monomer (I) in the production of the (co)polymer (a). $C_{1-18}$ alkyl (meth)acrylates are preferred.

The proportion of the monomer (II) and the other unsaturated monomer (comonomer) copolymerizable with the monomer (II) may be 0.1 to 75 % by weight, preferably 0.1 to 40 % by weight, especially preferably 0.1 to 20 % by weight, for the monomer (II) and 25 to 99.9 % by weight, preferably 60 to 99.9 % by weight, especially preferably 80 to 99.9 % by weight, for the copolymerizable unsaturated monomer (comonomer), based on the total weight of the two. If the amount of monomer (II) is less than 0.1 % by weight, curability is usually inferior and the dispersion of the particulate material is not well carried out. On the other hand, if it exceeds 75 % by weight, many silanol groups are formed by the hydrolysis of silylalkoxy groups, and the hydrophobicity of the composition tends to be unable to be retained. The copolymer (b) may be produced by a known polymerization method, for example, by the same solution polymerization method as in the production of ordinary acrylic resins. Specifically, it is preferred to add a small amount of an alcohol solvent to the polymerization solution and perform the polymerization in the presence of a polymerization initiator such as a peroxide or an azo compound.

The copolymer (b) in this invention generally has a number average molecular weight of about 4,000 to about 200,000, preferably about 8,000 to about 70,000, especially preferably 8,000 to 50,000.

Mixture (c)

In the composition of this invention, the (co)polymer (a) and the copolymer (b) may be used singly. If desired a combination of these may be used. The mixing ratio of the copolymer (a) to the copolymer (b) is not critical. The weight ratio of the (co)polymer (a) to the copolymer (b) is usually from 97.5:2.5 to 30:70, preferably from 97.5:2.5 to 50:50, more preferably from 97.5:2.5 to 70:30.

Particulate material [B]

The particulate material used in the composition of this invention is an organic or inorganic solid particulate material having an average particle diameter of not more than 5 micrometers, preferably not more than 3 micrometers, more preferably not more than 1 micrometer. It is important that the particulate material should exist as particles in the resulting film without dissolving in the polymer component.

Examples of the solid particulate material are fine particles of silica, fine particles of fluorocarbons and carbon black. Of these, the fine silica particles are preferred. Particularly preferred are fine silica particles treated with a hydrophobizing compound such as

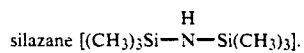

The smoothness of the surface of the resulting film can be improved by incorporating completely spherical fine particles such as completely spherical silica particles as the particulate material.

If the particulate material has an average particle diameter of more than 5 micrometers, the resulting film has a very uneven surface when observed microscopically, and tends to have reduced water repellency.

In the present invention, the proportions of the polymer [A] and the particulate material [B] are not particularly limited, and may be varied widely. Generally, for obtaining a film having satisfactory water repellency and other properties, the particulate material [B] is added in an amount of 20 to 600 parts by weight, preferably 50 to 450 parts by weight, especially preferably 80 to 300 parts by weight, per 100 parts by weight of the polymer [A] (as solids). As required, the composition of this invention may contain additives usually employed for paints, such as solvents, coloring agents (dyes, pigments), and surfactants, in addition to the polymer [A]) and the particulate material [B].

The composition of this invention may be prepared by mixing the polymer [A] and the particulate material [B] and optionally the above additives by using general agitating or dispersing methods, for example by using a dissolver, a steel ball mill, a pebble mill, a sand mill or an attriter.

The water-repellent film-forming composition of this invention may be directly coated on the surface of a substrate such as a metal, plastics, glass or wooden material or as a top coat on a film pre-formed on such a substrate. For example, by coating the composition of this invention on a fin material of a heat exchanger, its clogging owing to the adhesion of dew, frost or ice to the fin material can be prevented, and therefore, the decrease of the heat exchanging efficiency can be prevented. Furthermore, by coating the composition of this invention on insulators of high-voltage power cables, current short-circuiting at the time of wind, water and salt hazards can be circumvented. The composition of this invention may be molded and laminated to the surface of an article.

Coating of the composition of this invention may be accomplished by a known coating method such as spray coating, brush coating or roller coating. A good film can be obtained from the composition of this invention by coating it to a dry film thickness of usually 1 to 50 micrometers, preferably 10 to 30 micrometers, and drying the coating at a temperature from room temperature to 130° C.

When the surface of the film formed from the composition of this invention is observed through a micrograph, raised and depressed portions of micron size are seen. From contact angles, the surface energy $\gamma$ can be calculated from the following equation.

$\gamma = \gamma_p + \gamma_d (mN/m)$ wherein $\gamma_d = 32.8(1 - \cos\theta_p)/4$ $\gamma_p = \{(72.8 (1 - \cos\theta_w) - \sqrt{21.6\ \gamma_d}\}^2/204$ $\theta_p$: contact angle with paraffin $\theta_w$: contact angle with water The surface energy $\gamma$ of a film formed from the composition of this invention is usually not more than 4.2 mN/m which is much lower than that of Teflon having a low surface energy ($\gamma$ = about 21 mN/m). This is considered to suggest the relation of the shape of the surface and the apparent contact angle advocated by Wentzel et al. On a surface having such a low surface energy, the adhesive strength of water droplets, etc. is very small, and the water droplets become spherical, therefore rapidly leave the surface. Since the surface of a coated film formed from the composition of this invention has the above-mentioned properties, the composition of this invention is very useful for preventing water adhesion, snow adhesion and ice adhesion, and for preventing current short-circuiting by water adhesion The following examples illustrate the present invention more specifically. In these examples, parts and percentages are by weight.

[Examples of producing fluoroalkyl group-containing copolymers]

PRODUCTION EXAMPLE 1

Into a 1-liter flask were precisely weighed 350 parts of 2-perfluorooctylethyl methacrylate, 150 parts of 2-perfluorooctylethyl acrylate and 80 parts of hexafluoro-m-xylene (HFMX for short), and well mixed with stirring to form a mixed solution of the monomers and the solvent. The mixed solution was transferred to a 1-liter dropping funnel. A 1-liter four-necked flask fitted with a reflux condenser, a thermometer and a stirrer was provided and the 1-liter dropping funnel containing the mixed solution was attached to the flask, and 200 parts of the mixed solution was transferred to the four-necked flask. With stirring, the temperature was raised to 105 to 110° C. Then, while maintaining this temperature, 0.8 part of azobisisobutyronitrile (AIBN for short) as a polymerization catalyst was added (at this time, the reaction system had to be set up such that the flask was cooled to enable the exotherm to subside). Subsequently, the mixed solution was dropped at a rate of 50 parts/15 minutes from the dropping funnel, and every 15 minutes, 0.2 part of AIBN was added. Twenty minutes after the end of addition, 134 parts of HFMX was added to the flask. The temperature wes raised to 115° to 120° C., and 0.5 part by weight of AIBN was added every 30 minutes five times. One hour and thirty minutes after the final addition of AIBN, cooling of the flask was started. After the temperature reached 60° C., 286 parts of HFMX was added as a diluting solution to terminate the reaction.

The resulting fluoroalkyl group-containing copolymer solution was pale yellow and had a Gardner viscosity of F and a non-volatile content of 48.7 %.

PRODUCTION EXAMPLE 2

Production Example 1 was repeated except that a mixed solution composed of 280 parts of 2-perfluorooctylethyl methacrylate, 140 parts of 2-perfluorooctylethyl acrylate, 80 parts of styrene and 80 parts of HFMX was used as the mixed monomer-solvent solution.

PRODUCTION EXAMPLE 3

Production Example 1 was repeated except that a mixed solution composed of 320 parts of 2-perfluorooctylethyl methacrylate, 175 parts of perfluorooctylethyl acrylate, 5 parts of 2-hydroxyethyl acrylate, 70 parts of HFMX and 10 parts of butyl acetate was used as the monomer-solvent mixed solution, and 250 parts of HFMX and 36 parts of n-butyl alcohol were used as a diluting solvent. The resulting resin solution was pale yellow and had a Gardner viscosity of G and a non-volatile content of 49.1 %.

PRODUCTION EXAMPLE 4

Two hundred parts of perfluorooctylethyl acrylate, 200 parts of t-butyl methacrylate, 100 parts of methacrylic acid, 50 parts of HFMX and 30 parts of n-butyl alcohol were precisely weighed into a 1-liter flask, and well mixed with stirring. To the mixture was added 6 parts of AIBN as a polymerization initiator, and dissolved to form a monomer-solvent-initiator mixed solution. The mixed solution was transferred to a 1-liter dropping funnel. HFMX (100 parts) and 153 parts of butyl acetate were introduced into a 2-liter flask equipped with a reflux condenser, a thermometer and a stirrer, and the mixture was heated and maintained at 110° C. While this temperature was maintained, the mixed solution was added dropwise from the dropping funnel into the flask over 2 hours. One hour after the end of the addition, a mixture of 1 part of AIBN and 170 parts of butyl acetate was added dropwise over 1.5 hours. After the end of addition, the temperature was elevated to 120° C., and the reaction was carried out for 2 hours, the reaction mixture was then cooled. The resulting resin solution was slightly yellowish and had a Gardner viscosity of N and a non-volatile content of 50 %.

PRODUCTION EXAMPLE 5

350 Parts of 2-perfluorooctylethyl methacrylate, 125 parts of 2-perfluorooctylethyl acrylate, 25 parts of gamma-methacryloyloxypropyltrimethoxysilane and 80 parts of HFMX were precisely weighed, and stirred well in a dropping funnel to form a monomer-solvent mixed solution. Separately, a 1-liter four-necked flask equipped with a reflux condenser, a thermometer and a stirrer was provided, and the above dropping funnel containing the mixed solution was set up on the flask. Then from the dropping funnel, 200 parts of the mixed solution was transferred into the flask. The solution was heated to 105° to 110° C. and maintained at this temperature. AIBN (0.8 part) was precisely weighed, and added to the four-necked flask [at this time, the reaction system had to be set up such that the flask was cooled to enable the exotherm to subside). Then, the mixed solution was added dropwise at a rate of 50 parts/ 15 minutes from the dropping funnel, and every 15 minutes, 0.2 part of AIBN was added. After 20 minutes passed from the end of addition, 134 parts of HFMX was added to the flask, and the temperature was raised to 110° to 115° C. and maintained. Then, 0.5 part by weight of AIBN was added five times every 30 minutes. Two hours after the final addition of AIBN, the flask was cooled to below 60° C., and 286 parts of HFMX was added as a diluting solution to terminate the reaction.

The resulting resin solution was pale yellow and had a Gardner viscosity of E and a non-volatile content of 48.3 %.

PRODUCTION EXAMPLE 6

Production Example 5 was repeated except that a mixture composed of 200 parts of 2-perfluorooctylethyl methacrylate, 200 parts of 2-perfluoropropylethyl acrylate, 100 parts of gamma-methacryloyloxypropylmethyldimethoxysilane and 100 parts of HFMX was used as the monomer-solvent mixed solution, and 266 parts of HFMX was used as a diluting solvent.

The resulting resin solution was pale yellow, and had a Gardner viscosity of G and a non-volatile content of 49.2 %.

PRODUCTION EXAMPLE 7

Production Example 5 was repeated except that a mixture composed of 350 parts of 2-perfluorooctylethyl methacrylate, 140 parts of methyl methacrylate, 10 parts of vinyltrimethoxysilane and 80 parts of HFMX was used as the monomer-solvent mixed solution.

The resulting resin solution was pale yellow, and had a Gardner viscosity of H and a non-volatile content of 49.5 %.

PRODUCTION EXAMPLE 8

One hundred parts of 2-perfluorooctylethyl methacrylate, 250 parts of n-butyl methacrylate, 50 parts of styrene, 100 parts of gamma-methacryloyloxypropyltrimethoxysilane, 40 parts of HFMX, 40 parts of n-butyl alcohol and 7.5 parts of azobis-(dimethylvaleronitrile) were precisely weighed, and mixed to form a mixed solution. The mixed solution was transferred to a 1-liter dropping funnel. Separately, a 2-liter four-necked flask equipped with a reflux condenser, a thermometer and a stirrer was provided. HFMX (100 parts) and 153 parts of butyl acetate were transferred into the flask, and the flask and maintained at 105° to 110° C. One liter of the mixed solution was added dropwise to the flask from the dropping funnel over 2 hours. When one hour elapsed after the end of addition, a mixture of 1 part of AIBN and 170 parts of butyl acetate was added dropwise over 1.5 hours. Then, the mixture was heated to 115° to 120° C., maintained at this temperature for 2 hours, and then cooled to terminate the reaction.

The resulting resin solution was colorless and transparent, and had a Gardner viscosity of R and a non-volatile content of 50.5 %.

PRODUCTION EXAMPLE 9

Production Example 8 was repeated except that 250 parts of 2-perfluorooctylethyl methacrylate, 50 parts of 2-ethylhexyl acrylate, 200 parts of gamma-methacryloyloxypropyltrimethoxysilane, 40 parts of HFMX, 40 parts of isobutyl alcohol and 5 parts of azobis-(dimethylvaleronitrile) were mixed with stirring, and the resulting mixed solution was transferred to a 1-liter dropping funnel and used.

The resulting resin solution was pale yellow, and had a Gardner viscosity of K and a non-volatile content of 48.5 %.

PRODUCTION EXAMPLE 10

Production Example 5 was repeated except that a mixture composed of 300 parts of 2-perfluorooctylethyl methacrylate, 150 parts of 2-perfluoropropylethyl methacrylate, 50 parts of n-butyl alcohol and 80 parts of hexafluoro-m-xylene was used as the mixed solution.

The resulting resin solution was pale yellow, and had a Gardner viscosity of F and a non-volatile content of 48.5 %.

PRODUCTION EXAMPLE 11

Production Example 8 was repeated except that 50 parts of 2-perfluorooctylethyl acrylate, 350 parts of n-butyl methacrylate, 80 parts of styrene, 20 parts of 2-hydroxyethyl methacrylate and 5 parts of azobis-(dimethylvaleronitrile) and 80 parts of butyl acetate were precisely weighed, and mixed with stirring, and the resulting mixed solution was transferred to a 1-liter dropping funnel and used.

The resulting resin solution was colorless and transparent and had a Gardner viscosity of S and a non-volatile content of 48.8 %.

PRODUCTION EXAMPLE 12

Production Example 8 was repeated except that 150 parts of 2-perfluorooctylethyl methacrylate, 80 parts of 2-perfluorooctylethyl acrylate, 200 parts of methyl methacrylate, 70 parts of Silaplane FM0711 (note 1 below), 40 parts of HFMX and 40 parts of butyl acetate were precisely weighed and mixed with stirring, and the resulting mixed solution was transferred to a 1-liter dropping funnel and used.

The resulting resin solution was pale yellow and had a Gardner viscosity of N and a non-volatile content of 50.1 %.

(Note 1) Silaplane FM0711: a tradename for a vinyl group-containing reactive silicone of the following formula having a molecular weight of about 1,000, produced by Chisso Corporation.

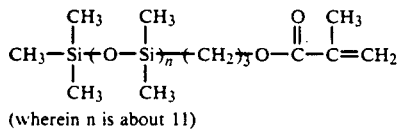

(wherein n is about 11)

PRODUCTION EXAMPLE 13

Production Example 8 was repeated except that 200 parts of 2-perfluorooctylethyl acrylate, 50 partsf of 2-perfluoropropylethyl methacrylate, 150 parts of Silaplane FM0711 (note 1 above), 80 parts of styrene, 20 parts of gamma-methacryloyloxypropyltrimethoxysilane, 40 parts of HFMX, 20 parts of butyl acetate and 20 parts of n-butyl alcohol, and the mixed solution was transferred to a 1-liter dropping funnel and used.

The resulting resin solution was pale yellow, and had a Gardner viscosity of G and a non-volatile content of 48.0 %.

PRODUCTION EXAMPLE 14 (for comparisons)

Production Example 8 was repeated except that 20 parts of 2-perfluorootylethyl methacylate, 315 parts of n-butyl methacrylate, 65 parts of styrene, 100 parts of gamma-methacryloyloxypropyltrimethoxysilane, 40 parts of HFMX, 40 parts of n-butyl alcohol and 7.5 parts of azobis-(dimethylvaleronitrile) were mixed, and the mixed solution was transferred to a 1-liter dropping funnel and used.

The resulting resin solution was colorless and transparent and had a Gardner viscosity of R and a non-volatile content of 49.7 %.

[Examples of producing silicon-containing copolymers]

PRODUCTION EXAMPLE A

Production Example 4 was repeated except that a mixture composed of 200 parts of isobutyl acrylate, 100 parts of lauryl methacrylate, 200 parts of gamma-acrylate, methacryloyloxyproyltrimethoxysilane, 33 parts of n-butyl alcohol an 7.5 parts of AIBN was used as the monomer-solvent-initiator mixed solution, and 200 parts of butyl acetate and 100 parts of n-butyl alcohol were used as the solution placed in advance in the 2-liter flask.

The resulting silicon-containing copolymer solution was colorless and tranparent and had a Gardner viscosity of P and a non-volatile content of 51.0%.

PRODUCTION EXAMPLE B

Production Example A was repeated except that a mixed solution composed of 200 parts of isobutyl acrylate, 100 parts of styrene, 190 parts of methyl methacrylate, 10 parts of vinyltrimethozysilane, 33 parts of n-butyl alcohol and 7.5 parts of AIBN was used as the monomer-solvent-initiator mixed solution.

The resulting silicon-containing copolymer solution was colorless and tranparent and had a Gardner viscosity of V and a non-volatile content of 51.2%.

PRODUCTION EXAMPLE C

Two hundred and fifty parts of 2-ethylhexyl acrylate, 150 parts of methyl methacrylate, 9.5 parts of styrene, 5 parts of gamma-methacryloyloxypropyltrimethoxysilane and 5 parts of AIBN were precisely weighed, and mixed with stirring. The resulting mixed solution was introduced into a 1-liter dropping funnel. Separately, a 2-liter four-necked flask equipped with a reflux condenser, a thermometer and a stirrer was provided, and a mixture of 200 parts of butyl acetate, 100 parts of xylene and 33 parts of n-butyl alcohol was introduced in the flask and heated to 105° to 110° C. and maintained at this temperature. The dropping funnel containing the mixture was set up on the flask, and the mixed solution was added dropwise from the dropping funnel over 2 hours. After one hour elapsed from the end of addition, a mixture of 1 part of AIBN and 167 parts of butyl acetate was added dropwise over 1.5 hours. Then, the reaction temperature was elevated to 110° to 115° C. and the reaction mixture was maintained at this temperature for 1.5 hours. Then, the reaction mixture was cooled to terminate the reaction.

The resulting resin solution was colorless and transparent and had a Gardner viscosity of S and a non-volatile content of 50.5%.

PRODUCTION EXAMPLE D

Production Example C was repeated except that a mixed solution composed of 400 parts of lauryl methacrylate, 75 parts of methyl methacrylate, 25 parts of gamma-methacryloyloxypropyltrimethoxysilane, 7.5 parts of azobis-(dimethylvaleronitrile) and 100 parts of xylene was used as the mixed solution to be charged into the 1-liter dropping funnel, and a mixture of 200 parts of butyl acetate and 33 parts of n-butyl alcohol was used as the mixed solution placed initially in the 2-liter four-necked flask.

The resulting resin solution was colorless and transparent and had a Gardner viscosity of M and a non-volatile content of 48.5%.

PRODUCTION EXAMPLE E

Production Example C was repeated except that a mixed solution composed of 300 parts of methyl methacrylate, 100 parts of Silaplane FM0711 (note 1 above), 50 parts of styrene, 50 parts of gamma-methacryloyloxypropyltrimethoxysilane and 7.5 parts of AIBN was used as the mixed solution to be charged into the 1-liter dropping funnel.

The resulting resin solution was slightly turbid and semitransparent and had a Gardner viscosity of V and a non-volatile content of 50.2%.

PRODUCTION EXAMPLE F

Production Example C was repeated except that a mixed solution composed of 300 parts of methyl methacrylate, 100 parts of Silaplane FM0711 (note 1 above), 100 parts of gamma-methacryloyloxypropylmethyldimethoxysilane and 7.5 parts of AIBN was used as the mixed solution to be charged into the 1-liter dropping funnel.

The resulting resin solution was slightly hazy and semitransparent, and had a Gardner viscosity of W and a non-volatile content of 49.8%.

PRODUCTION EXAMPLE G

Production Example C was repeated except that a mixed solutions composed of 200 parts of methyl methacrylate, 100 parts of Silaplane FM0711 (note 1), 200 parts of gamma-methacryloyloxypropyltrimethoxysilane and 7.5 parts of azobis(dimethylvaleronitrile) was used aa the mixed solution to be charged into the 1-liter dropping funnel.

The resulting resin solution was semitransparent and had a Gardner viscosity of M and a non-volatile content of 48.0%.

PRODUCTION EXAMPLE H

Production Example C was repeated except that a mixed solution composed of 300 parts of methyl methacrylate, 198 parts of n-butyl acrylate, 2 parts of vinyltrimethoxysilane and 5.0 parts of AIBN was used as the mixed solution to be charged into the 1-liter dropping funnel.

The resulting resin solution was colorless and transparent and had a Gardner viscosity of $Z_3$ and a non-volatile content of 51.2%.

PRODUCTION EXAMPLE I (comparison)

Production Example D was repeated except that a mixed solution composed of 400 parts of gamma-methacryloyloxypropyltrimethoxysilane, 85 parts of lauryl methacrylate, 15 parts of methyl methacrylate, 7.5 parts of azobis-(dimethylvaleronitrile) and 100 parts of n-butyl alcohol was used as the mixed solution to be charged into the 1-liter dropping funnel.

The resulting resin solution was colorless and transparent and had a Gardner viscosity of F and a non-volatile content of 47.7%.

EXAMPLE 1

One hundred parts of the silicon-containing copolymer resin solution obtained in Production Example A, 100 parts of the fluoroalkyl group-containing copolymer resin solution obtained in Production Example 1, 600 parts of 1,1,2-trichloro-1,2,2-trifluoroethane, 600 parts of HFMX and 30 parts of hydrophobic silica A (note 2) were mixed and dispersed by a shaker to form a composition.

(Note 2) Hydrophobic silica A: Fine powder of hydrophobic silica having an average particle diameter of about 0.1 micrometer "Tullanox-500", a tradename for a product of Tulco. Inc., U. S. A.

EXAMPLES 2–10 AND COMPARATIVE EXAMPLES 1–2

By operating in the same way as in Example 1, compositions of Examples 2–10 and Comparative Examples 1 and 2 were obtained except that the blending recipes shown in Table 1 were used.

Method of preparing test panel

Each of the compositions obtained in Examples 1 to 10 and Comparative Examples 1 and 2 was spray-coated on an aluminum panel treated with chromium phosphate so that the weight of the dried coat would become about 30 g/m$^2$. The coated panel was left to stand at room temperature for 24 hours to give a test panel.

The various tests described below were carried out on the test panel, and the results are shown in Table 1.

COMPARATIVE EXAMPLE 3

A polytetrafluoroethylene film was laminated on an aluminum plate to prepare a test panel. The test panel was tested as above, and the results are shown in Table 1.

TABLE 1

| Materials and Test Items | | Example 1 | 2 | 3 | 4 | 5 | 6 | 7 |
|---|---|---|---|---|---|---|---|---|
| Fluoroalkyl group-containing copolymer resin solution | Production Example | 1 | 2 | 1 | 1 | 1 | 3 | 1 |
| | Parts | 100 | 100 | 100 | 50 | 100 | 100 | 100 |
| Silicon-containing copolymer resin solution | Production Example | A | A | A | B | A | A | A |
| | Parts | 100 | 100 | 100 | 150 | 100 | 100 | 100 |
| Particulate material | Type | Hydrophobic silica A | Hydrophobic silica B (*1) | Hydrophobic silica A | Same as left | Same as left | Same as left | Non-treated silica C (*2) |
| | Parts | 30 | 50 | 100 | 200 | 300 | 100 | 100 |
| Solvent (Parts) | HFMX | 600 | 600 | 600 | 600 | 900 | 600 | 600 |
| | 1,1,2-trichloro-1,2,2-trifluoroethane | 600 | 600 | 600 | 600 | 900 | 600 | 600 |
| Test items | Contact angle with water (*5) | 130° | 145° | 156° | 140° | 156° | 154° | 152° |
| | Contact angle with paraffin (*6) | 125° | 132° | 138° | 130° | 100° | 137° | 132° |
| | Slippery falling property (*7) | Δ | | | Δ | | | |

| Materials and Test Items | | Example 8 | 9 | 10 | Comparative Example 1 | 2 | 3 |
|---|---|---|---|---|---|---|---|
| Fluoroalkyl group-containing copolymer resin solution | Production Example | 1 | 1 | 1 | 1 | — | Polytetrafluoroethylene film |
| | Parts | 100 | 180 | 20 | 100 | — | |
| Silicon-containing copolymer resin solution | Production Example | A | A | A | A | A | |
| | Parts | 100 | 20 | 180 | 100 | 200 | |
| Particulate | Type | Fluoro- | Hydro- | Same as | Non- | Hydro- | |

TABLE 1-continued

| material | | carbon (*3) | phobic silica A | left | treated silica D (*4) | phobic silica A | |
|---|---|---|---|---|---|---|---|
| | Parts | 100 | 100 | 100 | 100 | 100 | |
| Solvent (Parts) | HFMX | 600 | 600 | 600 | 600 | 600 | |
| | 1,1,2-trichloro-1,2,2-trifluoro-ethane | 600 | 600 | 600 | 600 | 600 | |
| Test items | Contact angle with water (*5) | 141° | 147° | 133° | 120° | 120° | 114° |
| | Contact angle with paraffin (*6) | 102° | 130° | 101° | 90° | wet | 58° |
| | Slippery falling property (*7) | Δ | | Δ | X | X | X |

The notes to Table 1 are as follows: (*1) Hydrophobic silica B: fine, spherical hydrophobic silica powder having an average particle diameter of 2.0 micrometers (tradename "Tospearl", made by Toshiba Silicone Co., Ltd.)

(*2) Non-treated silica C: fine silica having an average particle diameter of 0.1 micrometer not subjected to hydrophobizing treatment (*3) Fluorocarbon: fine fluorocarbon powder having an average particle diameter of about 0.3 micrometer (*4) Non-treated silica D: fine silica powder having an average particle diameter of about 7 micrometers not subjected to hydophobizing treatment (tradename "Syloid 308", a tradename for a product of Fuji Davison Chemical, Ltd.)

(*5) Contact angle with water: Deionized water (about 0.03 cc) was dropped as a water droplet onto a horizontal coated surface of a test panel by means of a syringe. One minute after the dropping, the contact angle between the water droplet and the coated surface was measured by a contact angle meter.

(*6) Contact angle with paraffin: In the above procedure of measuring the contact angle with water, liquid paraffin was used instead of deionized water, and the contact angle between the liquid paraffin and the coated surface was measured 4 minutes after the dropping of the paraffin. Otherwise, the procedure was the same as in (*5).

(*7) Slippery falling property of water droplet: A water droplet was prepared by dropping 0.03 cc of deionized water onto a coated test panel by means of a syringe. This coated plate was tilted, and the tilting angle of the coated plate at which the water droplet slipped and fell was determined.

The result was evaluated as follows:
: fell at less than 20°
⊿ : fell at 20° or more but less than 40°
Δ: fell at 40° or more but less than 60°
X : did no fall at 60°

EXAMPLE 11

Two hundred parts of the fluoroalkyl-containing copolymer resin solution obtained in Production Example 5, 300 parts of 1,1,2-trichloro-1,1,2-trifluoroethane, 600 parts of HFMX, 300 parts of butyl acetate and hydrophobic silica A (see note 2 in Example 1) were mixed and dispersed by a shaker to obtain a composition.

EXAMPLES 12-27 AND COMPARATIVE EXAMPLES 4 AND 5

Compositions of Examples 12-27 and Comparative Examples 4 and 5 were prepared by operating in the same way as in Example 11 except that the blending recipes shown in Table 2 were used. Test panels prepared by the same method as described in the foregoing Examples were tested. The test results are shown in Table 2.

TABLE 2

| Materials and Test Items | | Example 11 | 12 | 13 | 14 | 15 | 16 | 17 | 18 | 19 | 20 | 21 |
|---|---|---|---|---|---|---|---|---|---|---|---|---|
| Fluoroalkyl group-containing copolymer resin solution | Production Example | 5 | 5 | 5 | 5 | 5 | 6 | 7 | 8 | 9 | 10 | 11 |
| | Parts | 200 | 200 | 200 | 200 | 200 | 200 | 200 | 200 | 200 | 200 | 200 |
| Particulate material | Type | Hydrophobic silica A | Hydrophobic silica A | Hydrophobic silica A | Hydrophobic silica A | Hydrophobic silica A | Hydrophobic silica A | Hydrophobic silica A | Hydrophobic silica A | Hydrophobic silica A | Hydrophobic silica A | Hydrophobic silica A |
| | Parts | 20 | 50 | 100 | 200 | 500 | 100 | 100 | 100 | 100 | 100 | 100 |
| Solvent (Parts) | HFMX | 600 | 600 | 600 | 600 | 1200 | 600 | 600 | 300 | 600 | 600 | 300 |
| | 1,1,2-trichloro-1,2,2-trifluoro-ethane | 300 | 300 | 300 | 300 | 600 | 300 | 300 | — | 300 | 300 | — |
| | Butyl acetate | 300 | 300 | 300 | 300 | 600 | 300 | 300 | 600 | 300 | 300 | 700 |
| | Xylene | — | — | — | — | — | — | — | 300 | — | — | — |
| | n-Butyl alcohol | — | — | — | — | — | — | — | — | — | — | 200 |
| Test items | Contact angle with water (*5) | 136° | 148° | 152° | 152° | 155° | 152° | 150° | 154° | 150° | 148° | 145° |
| | Contact angle with Paraffin (*6) | 122° | 138° | 136° | 130° | wet | 134° | 136° | 136° | 131° | 136° | 130° |
| | Slippery falling property (*7) | ⊿ | | | | | | | ⊿ | ⊿ | | ⊿ |

Comparative

TABLE 2-continued

| Materials and Test Items | | Example 22 | Example 23 | Example 24 | Example 25 | Example 26 | Example 27 | Example 4 | Example 5 |
|---|---|---|---|---|---|---|---|---|---|
| Fluoroalkyl group-containing copolymer resin solution | Production Example | 12 | 13 | 5 | 5 | 5 | 5 | 14 | 5 |
| | Parts | 200 | 200 | 200 | 200 | 200 | 200 | 200 | 200 |
| Particulate material | Type | Hydrophobic silica A | Same as left | Hydrophobic silica B (*1) | Non-treated silica C (*2) | Fluorocarbon (*3) | Carbon black (*8) | Hydrophobic silica A | Non-treated silica D (*4) |
| | Parts | 100 | 100 | 100 | 100 | 100 | 100 | 100 | 100 |
| Solvent (Parts) | HFMX | 600 | 600 | 600 | 600 | 600 | 600 | 600 | 600 |
| | 1,1,2-trichloro-1,2,2-trifluoro-ethane | 300 | 300 | 300 | 300 | 300 | 300 | 300 | 300 |
| | Butyl acetate | 300 | 300 | 300 | 300 | 300 | 300 | 300 | 300 |
| Test items | Contact angle with water (*5) | 150° | 150° | 142° | 148° | 148° | 150° | 122° | 126° |
| | Contact angle with paraffin (*6) | 132° | 134° | 130° | 132° | 138° | 130° | 30° | 68° |
| | Slippery falling property (*7) | | | Δ | | Δ | | X | X |

Notes:
(*1) to (*7) in Table 2 are the same as in Table 1.
(*8): Carbon black powder having an average particle diameter of about 0.3 micrometer.

EXAMPLE 28

Two hundred parts of the silicon-containing copolymer resin solution obtained in Production Example C, 600 parts of butyl acetate, 400 parts of xylene, 200 parts of n-butyl alcohol and 20 parts of hydrophobic silica A (see note 2 in Example 1) were mixed and dispersed by a shaker to obtain a composition.

EXAMPLES 29–42 and COMPARATIVE EXAMPLES 6 and 7

Compositions of Examples 29-42 and Comparative Examples 6 and 7 were prepared by operating in the same way as in Example 28 except that the blending recipes shown in Table 3 were used.

Test panels prepared by the same method as described in the foregoing Examples were tested. The test results are shown in Table 3.

TABLE 3

| Materials and Test Items | | Example 28 | Example 29 | Example 30 | Example 31 | Example 32 | Example 33 | Example 34 | Example 35 | Example 36 |
|---|---|---|---|---|---|---|---|---|---|---|
| Silicon-containing copolymer resin solution | Production Example | C | C | C | C | C | D | E | F | G |
| | Parts | 200 | 200 | 200 | 200 | 200 | 200 | 200 | 200 | 200 |
| Particulate material | Type | Hydrophobic silica A | Hydrophobic silica A | Hydrophobic silica A | Hydrophobic silica A | Hydrophobic silica A | Hydrophobic silica A | Hydrophobic silica A | Hydrophobic silica A | Hydrophobic silica A |
| | Parts | 20 | 50 | 100 | 200 | 500 | 100 | 100 | 100 | 100 |
| Solvent (Parts) | Butyl acetate | 600 | 600 | 600 | 600 | 1200 | 600 | 600 | 600 | 600 |
| | Xylene | 400 | 400 | 400 | 400 | 800 | 400 | 400 | 400 | 400 |
| | n-Butyl alcohol | 200 | 200 | 200 | 200 | 400 | 200 | 200 | 200 | 200 |
| Test items | Contact angle with water (*5) | 120° | 130° | 148° | 148° | 152° | 145° | 150° | 144° | 140° |
| | Contact angle with paraffin (*6) | 38° | 27° | wet | wet | wet | wet | wet | wet | wet |
| | Slippery falling property (*7) | Δ | Δ | | | | | | | Δ |

| Materials and Test Items | | Example 37 | Example 38 | Example 39 | Example 40 | Example 41 | Example 42 | Comparative Example 6 | Comparative Example 7 |
|---|---|---|---|---|---|---|---|---|---|
| Silicon-containing copolymer resin solution | Production Example | H | D | D | D | D | D | I | D |
| | Parts | 200 | 200 | 200 | 200 | 200 | 200 | 200 | 200 |
| Particulate material | Type | Hydrophobic silica A | Hydrophobic silica B (*1) | Non-treated silica C (*2) | Fluorocarbon (*3) | Same as left | Carbon black (*8) | Hydrophobic silica A | Non-treated silica D (*4) |
| | Parts | 100 | 100 | 100 | 100 | 200 | 100 | 100 | 100 |
| Solvent (Parts) | Butyl acetate | 600 | 600 | 600 | 600 | 600 | 600 | 600 | 600 |
| | Xylene | 400 | 400 | 400 | 400 | 400 | 400 | 400 | 400 |
| | n-Butyl alcohol | 200 | 200 | 200 | 200 | 200 | 200 | 200 | 200 |
| Test items | Contact angle with water (*5) | 142° | 120° | 140° | 148° | 150° | 140° | 110° | 135° |
| | Contact angle with paraffin (*6) | wet | wet | wet | 92° | 110° | wet | wet | wet |
| | Slippery falling property (*7) | Δ | Δ | Δ | | | Δ | X | X |

TABLE 3-continued property (*7)

Notes
(*1) to (*7) in Table 3 are the same as in Table 1, and Note (*8) is the same as in Table 2.

We claim:
1. A water-repellent film-forming composition comprising

[A] a mixture of
(a) a (co)polymer compound of 5 to 100% by weight of a fluroalkyl group-containing (meth)acrylic monomer represented by the following formula (I)

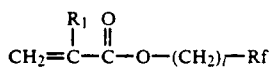

(I)

wherein $R_1$ represents a hydrogen atom or a methyl group, l is an integer of 1 to 11, and Rf represents $-C_mF_{2m+1}$ or $-C_nF_{2n}H$ in which m is an integer of 1 to 20 and n is an integer of 1 to 20, and 0 to 95% by weight of an unsaturated monomer co-polymerizable with the fluoroalkyl group-containing (meth)acrylic monomer, and (b) a copolymer composed of 0.1 to 75% by weight of a silicon-containing polymerizable unsaturated monomer represented by the following formula (II)

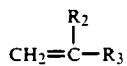

(II)

wherein $R_2$ represents a hydrogen atom or a methyl group, and $R_3$ represents a group of the formula

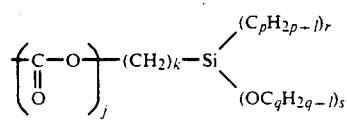

in which j is an integer of 0 or 1, k is an integer of 0 to 6, p is an integer of 1 to 5, q is an integer of 1 to 20, r is an integer of 0 to 2, s is an integer of 1 to 3, and $r+s=3$, and 25 to 99.9 by weight of an unsaturated monomer copolymerizable with the silicon-containing polymerizable unsaturated monomer, and

[B] fine silica particles having an average particle diameter of not more than 5 micrometers, the proportion of the fine silica particles being 50 to 450 parts by weight per 100 parts by weight of the polymer [A].

2. The composition of claim 1 in which in the general formula (I), $R_1$ represents a hydrogen atom or a methyl group, l is an integer of 1 to 6, and Rf represents $-C_mF_{2m-1}$ or $-C_nF_{2n}H$ where m is an integer of 1 to 10 and n is an integer of 1 to 10.

3. The composition of claim 1 in which the fluoroalkyl group contains (meth)acrylic monomer is 2-perfluoro-octylethyl methacrylate or 2-perfluoroisononylethyl methacrylate.

4. The composition of claim 1 in which the other unsaturated monomer copolymerizable with the fluoroalkyl group-containing (meth)acrylic monomer is selected from $C_{1-18}$ alkyl esters of (meth)acrylic acid and styrene.

5. The composition of claim 1 in which the (co)polymer (a) is a (co)polymer composed of 10 to 100% by weight of the fluoroalkyl group-containing (meth)acrylic monomer of formula (I) and 0.1 to 90% by weight of another unsaturated monomer copolymerizable with the monomer of formula (I).

6. The composition of claim 1 in which the (co)polymer (a) is composed of 5 to 99.9% by weight of the fluoroalkyl group-containing (meth)acrylic monomer of formula (I), 0.1 to 75% by weight of a silicon-containing polymerizable unsaturated monomer represented by the following general formula (II)

(II)

wherein $R_2$ represents a hydrogen atom or a methyl group, and $R_3$ represents a group of the formula

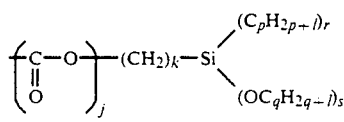

in which j is an integer of 0 or 1, k is an integer of 0 to 6, p is an integer of 1 to 5, q is an integer of 1 to 20, r is an integer of 0 to 2, s is an integer of 1 to 3, and $r+s=3$, and 0 to 94.9% by weight of another unsaturated monomer copolymerizable with the fluoroalkyl group-containing (meth)acrylic monomer.

7. The composition of claim 6 in which the silicon-containing polymerizable unsaturated monomer of formula (II) is selected from gamma-methacryloyloxypropyltrimethoxysilane and gamma-methacryloyloxypropylmethyldimethoxysilane.

8. The composition of claim 1 in which the (co)polymer (a) has a number average molecular weight of about 3,000 to about 500,000.

9. The composition of claim 1 in which in formula (II), $R_2$ represents a hydrogen atom or a methyl group and $R_3$ represents a group of the following formula

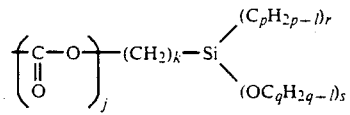

in which j is an integer of 0 to 1, k is an integer of 1 to 4, p is an integer of 1 to 3, q is an integer of 1 to 10, r is an integer of 0 to 2, s is an integer of 1 to 3, and $r+s=3$.

10. The composition of claim 1 in which the silicon-containing polymerizable unsaturated monomer is selected from gamma-methacryloyloxypropyltrimethoxysilane and gamma-methacryloyloxypropylmethyldimethoxysilane.

11. The composition of claim 1 in which the other unsaturated monomer copolymerizable with the silicon-containing polymerizable unsaturated monomer is selected from $C_{1-18}$ alkyl esters of (meth)acrylic acid and styrene.

12. The composition of claim 1 in which the (co)polymer (b) is a copolymer composed of 0.1 to 40% by weight of the silicon-containing polymerizable unsaturated monomer of formula (II) and 60 to 99.9% by weight of another unsaturated monomer copolymerizable with the monomer of formula (II).

13. The composition of claim 1 in which the mixture (c) is a mixture of the (co)polymer (a) and the copolymer (b) in a weight ratio of from 97.5:2.5 to 30:70.

14. The composition of claim 13 in which the weight ratio of the (co)polymer (a) to the copolymer (b) is from 97.5:2.5 to 50:50.

15. The composition of claim 1 in which the particulate material [B] has an average particle diameter of not more than 3 micrometers.

16. The composition of claim 1 in which the particulate material [B] is selected from fine silica powder, fine fluorocarbon powder and carbon black.

17. The composition of claim 1 in which the particulate material [B] is a fine silica powder optionally treated with silazane.

18. The composition of claim 1 in which the amount of the particulate material [B] is 20 to 600 parts by weight per 100 parts by weight of the polymer [A] (as solids).

19. The composition of claim 1 in which the amount of the particulate material [B] is 50 to 450 parts by weight per 100 parts by weight of the polymer [A] (as solids).

20. The composition of claim 1 in which the amount of the fine silica particles is 80 to 300 parts by weight of the mixture [A] (as solids).

* * * * *